US012594684B2

(12) United States Patent
Ren et al.

(10) Patent No.: US 12,594,684 B2
(45) Date of Patent: Apr. 7, 2026

(54) SHAVING SYSTEM AND RESILIENT CUTTING MEMBER THEREOF

(71) Applicant: WENZHOU MEIBAO TECHNOLOGY CO., LTD., Wenzhou (CN)

(72) Inventors: Xiangrong Ren, Wenzhou (CN); Qun Li, Hangzhou (CN)

(73) Assignee: WENZHOU MEIBAO TECHNOLOGY CO., LTD., Wenzhou (CN)

( * ) Notice: Subject to any disclaimer, the term of this patent is extended or adjusted under 35 U.S.C. 154(b) by 139 days.

(21) Appl. No.: 18/730,477

(22) PCT Filed: Jan. 24, 2022

(86) PCT No.: PCT/CN2022/073381
§ 371 (c)(1),
(2) Date: Jul. 19, 2024

(87) PCT Pub. No.: WO2023/137737
PCT Pub. Date: Jul. 27, 2023

(65) Prior Publication Data
US 2025/0100171 A1 Mar. 27, 2025

(51) Int. Cl.
*B26B 21/56* (2006.01)
*B26B 21/22* (2006.01)

(52) U.S. Cl.
CPC ............ *B26B 21/565* (2013.01); *B26B 21/22* (2013.01)

(58) Field of Classification Search
CPC .............................. B26B 21/22; B26B 21/565
See application file for complete search history.

(56) References Cited

U.S. PATENT DOCUMENTS 4,516,320 A * 5/1985 Peleckis .............. B26B 21/4018 30/49
4,720,917 A * 1/1988 Solow ..................... B26B 21/52 30/346.5
5,003,694 A * 4/1991 Chen ................... B26B 21/4018 30/32
6,473,970 B1 11/2002 Prochaska
(Continued)

FOREIGN PATENT DOCUMENTS

CN 1337899 A 2/2002
CN 101559604 A 10/2009
(Continued)

*Primary Examiner* — Sean M Michalski
(74) *Attorney, Agent, or Firm* — SHIMOKAJI IP

(57) ABSTRACT

A resilient cutting member includes an elongated metal support body and an elongated metal blade. The metal support includes an elongated platform portion supporting the metal blade from below; a blade edge of the metal razor blade is located directly front of and above the platform portion; a first position and a second position spaced apart in a length direction of the metal blade are respectively fixed with the platform portion, the length of a free section, located between the first position and the second position, of the metal blade is greater than or equal to 10 mm and less than or equal to 30 mm, and the free section makes reversible bending deformation with respect to the platform portion, so that the cutting member more tightly fits to the skin, and shaving is cleaner.

19 Claims, 7 Drawing Sheets

(56) References Cited

U.S. PATENT DOCUMENTS

| | | | | |
|---|---|---|---|---|
| 2001/0039739 | A1* | 11/2001 | Ferraro | B26B 21/22 30/526 |
| 2002/0050065 | A1* | 5/2002 | Kludjian | B26B 21/522 30/298 |
| 2002/0062568 | A1* | 5/2002 | Stiles | B26B 21/22 30/526 |
| 2002/0088122 | A1* | 7/2002 | Zuidervaart | B26B 21/22 30/34.2 |
| 2005/0172489 | A1* | 8/2005 | Aviza | B26B 21/4068 30/32 |
| 2010/0077618 | A1* | 4/2010 | Peterson | B26B 21/565 30/84 |
| 2014/0000114 | A1* | 1/2014 | Wester | B26B 21/28 30/32 |
| 2019/0016001 | A1* | 1/2019 | Zucker | B26B 21/54 |
| 2019/0358838 | A1* | 11/2019 | Wonderley | B26B 21/08 |
| 2021/0031387 | A1* | 2/2021 | Paspatis | B26B 21/4012 |
| 2022/0202677 | A1* | 6/2022 | Stephens | A61Q 9/02 |
| 2023/0166418 | A1* | 6/2023 | Park | B26B 21/22 30/50 |

FOREIGN PATENT DOCUMENTS

| | | | |
|---|---|---|---|
| CN | 102232011 | A | 11/2011 |
| CN | 102655993 | A | 9/2012 |
| CN | 204546577 | U | 8/2015 |
| CN | 110290904 | A | 9/2019 |
| CN | 110883793 | A | 3/2020 |

* cited by examiner

SHAVING SYSTEM AND RESILIENT CUTTING MEMBER THEREOF

FIELD OF THE INVENTION

The present application relates to the field of shaving, and particularly to a shaving system and a resilient cutting member thereof.

BACKGROUND OF THE INVENTION

In the razor head disclosed in Chinese Patent No. 201520039987.8, the razor blade 20 is supported from below by a metal support, and there is a row of welding points arranged at equal spacing along the length of the razor blade 20 between the razor blade and the metal support. These evenly spaced welding points fully weld the entire razor blade 20 to the metal support, preventing any relative movement between the razor blade 20 and the metal support.

As the razor head moves along the skin, the resistance faced by the razor blade 20 from the hair (such as facial hair) is significantly less than the support provided by the metal support to the razor blade 20. This results in the cutting edges of the razor blade cutting the hair with a rigid collision, increasing skin irritation and thereby affecting shaving comfort.

Therefore, there is an urgent need for a shaving system with a resilient cutting member that fits more closely to the skin for a cleaner shave to overcome the above-mentioned drawbacks.

SUMMARY OF THE INVENTION

One objective of the present application is to provide a resilient cutting member that fits more closely to the skin for a cleaner shave.

Another objective of the present application is to provide a resilient cutting member that fits more closely to the skin for a cleaner shave.

To achieve the above-mentioned objectives, a resilient cutting member of the present application includes an elongated metal support and an elongated metal razor blade. The metal support comprises an elongated platform portion that supports the metal razor blade from below, and a cutting edge of the metal razor blade is positioned directly above a front of the platform portion; a first position and a second position spaced apart in a length direction of the metal razor blade are respectively fixed with the platform portion, a length of a free section of the metal razor blade between the first position and the second position is greater than or equal to 10 mm and less than or equal to 30 mm, and the free section of the metal razor blade is configured to make a reversible bending deformation relative to the platform portion when obstructed by hair during shaving.

Preferably, the free section of the metal razor blade is bent upward and backward relative to the platform portion when obstructed by hair during shaving.

Preferably, one or more welding points are provided between the first position and the platform portion, and between the second position and the platform portion, the welding points are arranged and spaced apart along a length of the metal razor blade, a shortest distance between two welding points between the first position and the second position is greater than or equal to 10 mm and less than or equal to 30 mm.

Preferably, the first position is formed at a left end of the metal razor blade, and the second position is formed at a right end of the metal razor blade, a distance between a rightmost welding point on the left end of the metal razor blade and a leftmost welding point on the right end of the metal razor blade is greater than or equal to 10 mm and less than or equal to 30 mm.

Preferably, all welding points between the left end of the metal razor blade and the platform portion are arranged at equal spacing, and all welding points between the right end of the metal razor blade and the platform portion are arranged at equal spacing.

Preferably, one or more metal razor blades are supported by the platform portion, and all metal razor blades are arranged in a row along a length thereof.

Preferably, the metal razor blade comprises a uniform portion supported by the platform portion and a tapered portion extending forward beyond the platform portion, the cutting edge of the metal razor blade is located at the tapered portion, a thickness of the uniform portion ranges from 0.07 mm to 0.15 mm, and a front-to-back dimension of the metal razor blade ranges from 0.8 mm to 1.5 mm.

Preferably, the metal support further comprises an elongated base portion extended obliquely backward and downward relative to the platform portion, and an elongated curved portion connecting the base portion and the platform portion, and an angle between the base portion and the platform portion ranges from 110 degrees to 120 degrees.

Preferably, the metal support is made of metal with a thickness ranging from 0.10 mm to 0.32 mm, and the curved portion has a radius of curvature less than 0.1 mm.

To achieve the above-mentioned objectives, a shaving system of the present application includes a razor head frame and the resilient cutting member mentioned above. The razor head frame includes a receiving space, the resilient cutting member is located within the receiving space. A left end of the resilient cutting member is fitted to a left side wall of the razor head frame, a right end of the resilient cutting member is fitted to a right side wall of the razor head frame, and the cutting edge is faced to a front side wall of the razor head frame.

Preferably, the shaving system of the present application further includes a left retainer and a right retainer. The left retainer crosses over the left end of the resilient cutting member from above, and the left retainer and the left side wall of the razor head frame clamp the left end of the resilient cutting member, the right retainer crosses over the right end of the resilient cutting member from above, and the right retainer and the right side wall of the razor head frame clamp the right end of the resilient cutting member.

In comparison with the prior art, the metal razor blade is fixed to the platform section at the first and second positions spaced along the length, and the length of the free section of the metal razor blade between the first and second positions is greater than or equal to 10 mm and less than or equal to 30 mm, thus the free section of the metal razor blade makes reversible bending deformation relative to the platform portion when obstructed by the hair during shaving. As a result, the bent metal razor blade better conforms to the skin and adaptively changes the relationship between the cutting edge and the direction of pulling force. That is, the cutting edge of the metal razor blade is changed from being perpendicular to the direction of force when in unused to being non-perpendicular to the direction of force when in used, thereby allowing the curved cutting edge to cut the hair more cleanly, reducing skin irritation, and providing better comfort.

DETAILED DESCRIPTION OF ILLUSTRATED EMBODIMENTS

To explain the technical content and structural features of the present application in detail, the following description is made in conjunction with the embodiments and accompanying drawings.

Figure 1:
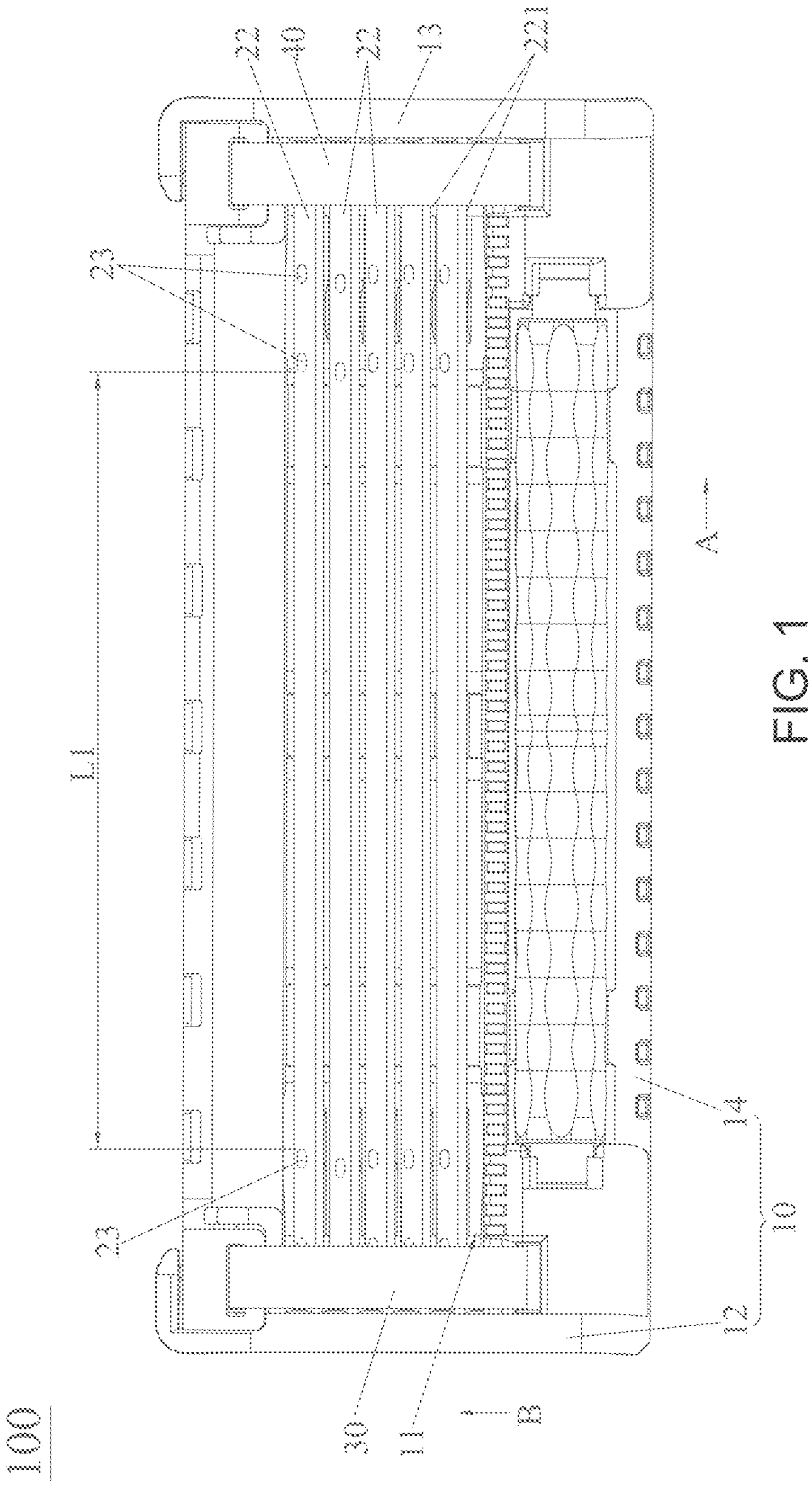
FIG. 1 is a top-down view of the shaving system of the present application.
Figure 2:
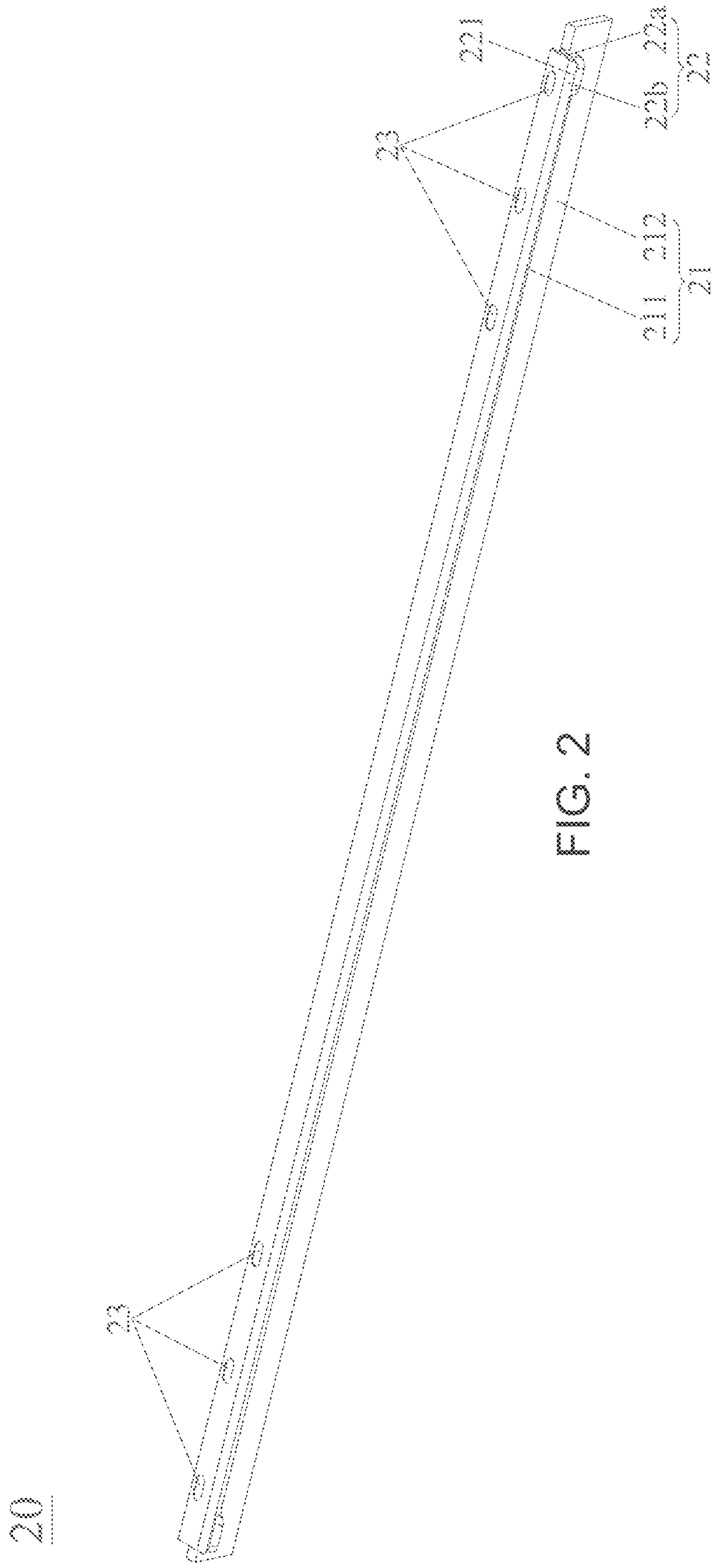
FIG. 2 is a perspective view of the resilient cutting member according to the first embodiment of the present application.
Figure 3:
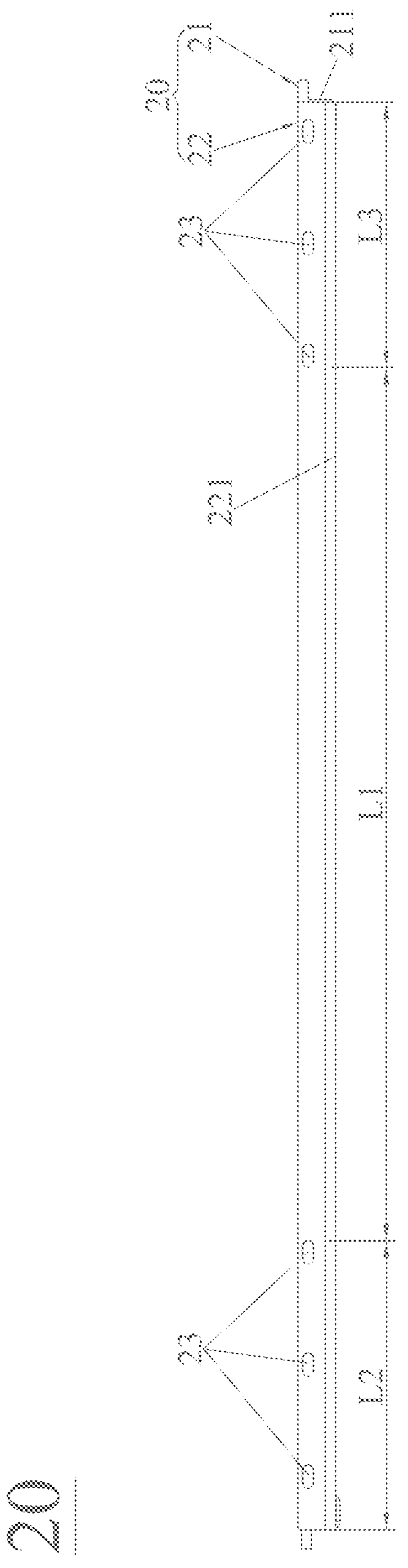
FIG. 3 is a top-down view of the resilient cutting member shown in FIG. 2.

Referring to FIGS. 1 to 3, the shaving system 100 of the present application includes a blade head frame 10, a left retainer 30, a right retainer 40, and an resilient cutting member 20 of a first embodiment. The blade head frame 10 has a receiving space 11. Preferably, the blade head frame 10 is a square structure. Correspondingly, the receiving space 11 is a square space, effectively utilizing the dimension of the blade head frame 10. Of course, the shape of both the blade head frame 10 and the receiving space 11 can be different based on actual needs, which is not limited to that shown in FIG. 1. The resilient cutting member 20 is located within the receiving space 11, its left end is fitted to the left side wall 12 of the blade head frame 10, thereby providing a mounting location for the left end of the resilient cutting member 20, and the right end of the resilient cutting member 20 is fitted to the right side wall 13 of the blade head frame 10, thereby providing a mounting location for the right end of the resilient cutting member 20. The cutting edge 221 faces the front side wall 13 of the blade head frame 10 to meet the requirement of the shaving system 100 of the present application for shaving hair 200 (see FIG. 5) when moving in the direction opposite to the arrow B shown in FIG. 1. The left retainer 30 spans the left end of the resilient cutting member 20 from above. Preferably, the left retainer 30 spans the left end of the resilient cutting member 20 along the front-to-back direction of the blade head frame 10, which is not limited to this however. The left retainer 30 also clamps the left end of the resilient cutting member 20 with the left side wall 12 of the blade head frame 10 to secure the left end of the resilient cutting member 20 to the left side wall 12 of the blade head frame 10. The right retainer 40 spans the right end of the resilient cutting member 20 from above. Preferably, the right retainer 40 spans the right end of the resilient cutting member 20 along the front-to-back direction of the blade head frame 10, which is not limited to this however. The right retainer 40 also clamps the right end of the resilient cutting member 20 with the right side wall 13 of the blade head frame 10 to secure the right end of the resilient cutting member 20 to the right side wall 13 of the blade head frame 10. Specifically, in FIG. 1, there are five resilient cutting members 20, arranged spaced apart along the front-to-back direction of the blade head frame 10. Of course, based on actual needs, the number of resilient cutting members 20 may be one, two, three, or four, which is not limited to that shown in FIG. 1. Additionally, in FIG. 1, the left retainer 30 and the right retainer 40 are two independent, separate sheet-like components. Of course, based on actual needs, the left retainer 30 and right retainer 40 can be integrated into one component, which are not limited to those shown in FIG. 1.

Figure 4:
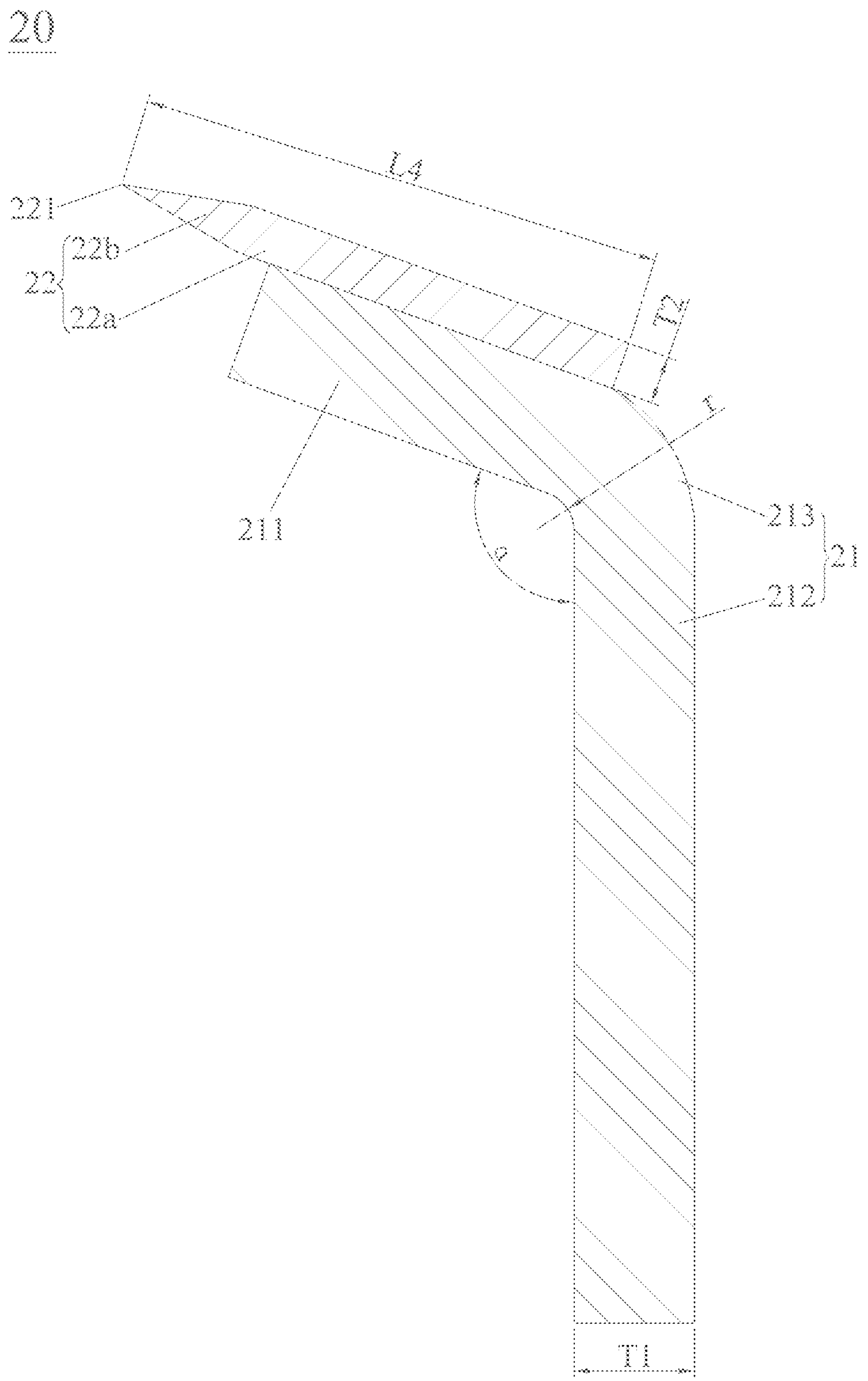
FIG. 4 is a cross-sectional view of the resilient cutting member shown in FIG. 3.

More specifically, combining FIG. 4, the resilient cutting member 20 of the first embodiment includes an elongated metal support 21 and an elongated metal razor blade 22. The metal support 21 includes an elongated platform portion 211 that supports the metal razor blade 21 from below, an elongated base portion 212 extending obliquely downward and backward relative to the platform portion 211, and an elongated curved portion 213 connecting the base portion 212 and the platform portion 211. An angle α between the base portion 212 and the platform portion 211 ranges from 110 to 120 degrees, preferably between 110 and 113 degrees, and optimally around 111.6 degrees, which is not limited to this however. The cutting edge 221 of the metal razor blade 22 is positioned directly above the front of the platform portion 211. The metal razor blade 22 is fixed to the platform portion 211 at a first position L2 and a second position L3, respectively, spaced along its length. A free section L1 of the metal razor blade 22 between the first position L2 and the second position L3 is between 10 mm and 30 mm in length, preferably between 15 mm and 20 mm, and optimally between 15 mm and 18 mm. This configuration ensures that the free section L1 can bend sensitively under the obstruction of hair 200 while ensuring the reliability of the metal razor blade 22 being fixed to the platform portion 211 at the first and second positions L2 and L3. During shaving, the free section L1 of the metal razor blade 22 makes reversible bending deformation relative to the platform portion 211 when obstructed by hair 200. Preferably, the free section L1 of the metal razor blade 211 bends upward and backward relative to the platform portion 211 to fit more closely to the skin. Specifically, in FIG. 4, the metal razor blade 22 includes a uniform portion 22*a* supported by the platform portion 211 and a tapered portion 22*b* extending forward beyond the platform portion 211. The cooperation of the uniform portion 22*a* with the platform portion 211 ensures the reliable connection between the metal razor blade 22 and the metal support 21. The cutting edge 221 of the metal razor blade 22 is located on the tapered portion 22*b*, with the thickness T2 of the uniform portion 22*a* ranging from 0.07 mm to 0.15 mm, preferably from 0.07 mm to 0.09 mm; a front-to-back dimension L4 of the metal razor blade 22 ranging from 0.8 mm to 1.5 mm, for example, from 0.8 mm to 0.99 mm. In such configuration, the free section L1 may make more sensitive and smoother bending deformation when obstructed by the hair 200. The metal support 21 is made of metal with a thickness T1 between 0.10 mm and 0.32 mm, and the curved portion 213 has a curvature radius r of less than 0.1 mm, for example, less than 0.09 mm, and optimally around 0.081 mm. This configuration further enhances the ease and reliability of manufacturing the metal support 21 from metal with a thickness T1 between 0.10 mm and 0.32 mm by bending. It should be noted that the base portion 212 and the curved portion 213 of the metal support 21 can be omitted if not needed, so the structure is not limited to that shown in FIG. 4.

As shown in FIG. 3, the first position L2 is formed at a left end of the metal razor blade 22, and the second position L3 is formed at a right end of the metal razor blade 22. Both ends of the metal razor blade 22 are provided with three welding points 23 spaced along its length and fixed to the platform portion 211, a distance between a rightmost welding point 23 on the left end of the metal razor blade 22 and a leftmost welding point 23 on the right end of the metal razor blade 22 is greater than or equal to 10 mm and less than or equal to 30 mm. Specifically, in FIG. 3, all welding points 23 between the left end of the metal razor blade 22 and the platform portion 212 are arranged at equal spacing, and all welding points 23 between the right end of the metal razor blade 22 and the platform portion 212 are arranged at equal spacing to enhance the reliability of connection between both ends of the metal razor blade 22 and the platform portion 212. It should be noted that the number of the welding points 23 at both ends of the metal razor blade 22 also may be one or two as required, which is not limited to that shown in FIGS. 1 to 3. Furthermore, based on the actual demands, the metal razor blade 22 may be fixed to the platform portion 212 by riveting or other connecting ways, which is not limited to the welding point connection shown in FIGS. 1-3. Additionally, in other embodiments, the first position L2 does not necessarily have to be formed at the left end of the metal razor blade 22, and similarly, the second position L3 does not necessarily have to be formed at the right end of the metal razor blade 22, which is not limited to that shown in FIGS. 1 to 3.

Figure 5:
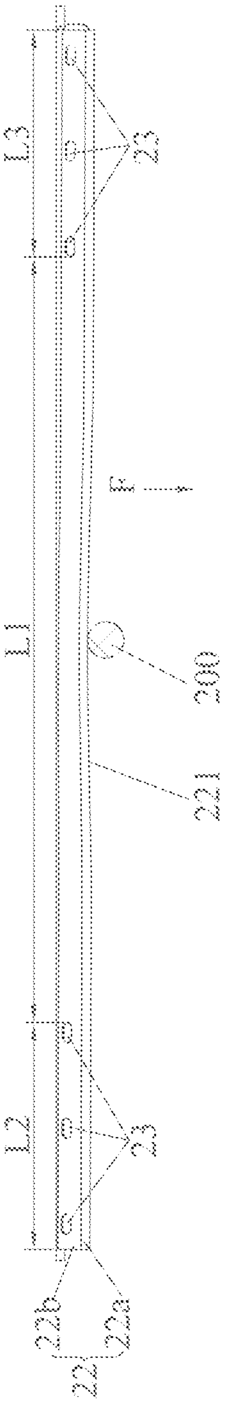
FIG. 5 is a view showing the resilient cutting member with a cambered bending deformation when obstructed by hair, as shown in FIG. 3.

Combining with FIG. 5, the bending deformation of the resilient cutting member 20 of the first embodiment is explained as follows. During the process of the shaving system 100 sliding on the skin from back to front along the blade head frame 10, the free section L1 of the metal razor blade 22 in the resilient cutting member 20 is obstructed by hair 200 and applied with backward resistance, causing the free section L1 to bend backward and upward, as shown in FIG. 5. As a result, the bent metal razor blade 22 fits more closely to the skin and adaptively changes the relationship between the cutting edge 221 of the metal razor blade 22 and the direction of force F. Specifically, the cutting edge 221 of the metal razor blade 22 is changed from being perpendicular to the direction of force F when in unused to being non-perpendicular to the direction of force F when in used, thereby allowing the curved cutting edge 221 to cut the hair 200 more cleanly, reducing skin irritation, and providing better comfort.

Figure 6:
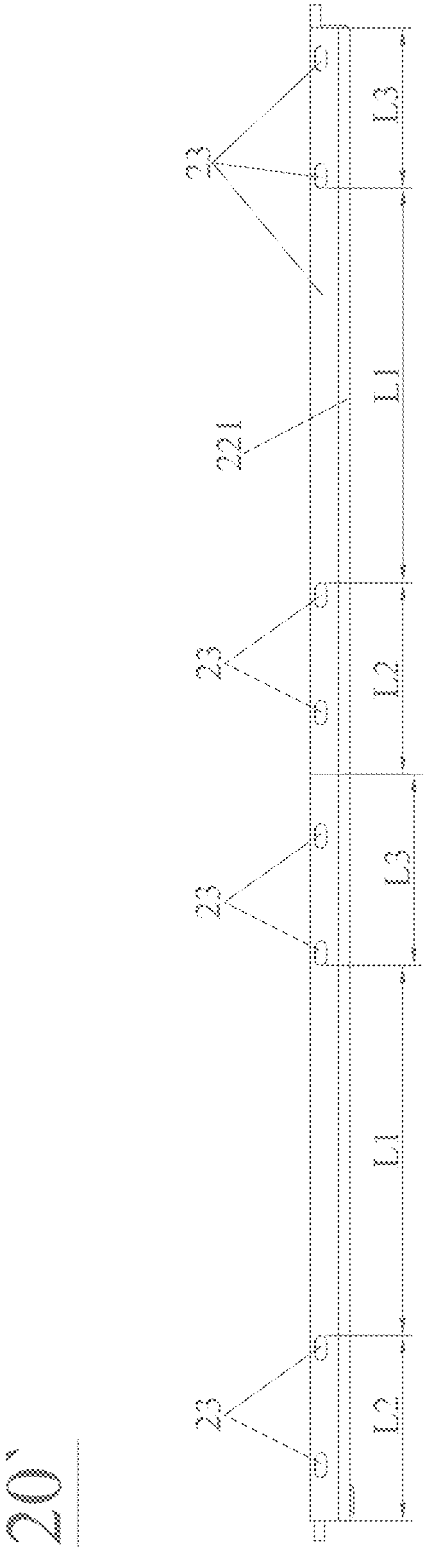
FIG. 6 is a top-down view of the resilient cutting member according to the second embodiment of the present application.

Referring to FIG. 6, the resilient cutting member 20' of the second embodiment is structurally similar to the resilient cutting member 20 of the first embodiment, with the following differences.

First, in FIG. 6, two metal razor blades 22 are supported by the platform portion 211 of the same metal support body 21, and arranged in a row along the length. While in FIG. 3, only one metal razor blade 22 is supported by the platform portion 211 of the same metal support body 21. Therefore, it can be understood that the combined length of the two metal razor blades 22 in FIG. 6 equals the length of the metal razor blade 22 in FIG. 3.

Second, in FIG. 6, two welding points 23 are configured between the first position L2/the second position L3 and the platform portion 211. While in FIG. 3, three welding points 23 are configured between the first position L2/the second position L3 and the platform portion 211.

Apart from the above differences, everything else is the same as in the first embodiment, which is not reiterated here therefore. It should be understood that although FIG. 6 shows the platform portion 211 supporting two metal razor blades 22, under the conditions where the length of the free section L1 of each metal razor blade 22 is greater than or equal to 10 mm and less than or equal to 30 mm, and the total length of all metal razor blades 22 matches the length of the platform portion 211, the number of metal razor blades 22 also may be three or four, which is not limited to that shown in FIG. 6.

Figure 7:
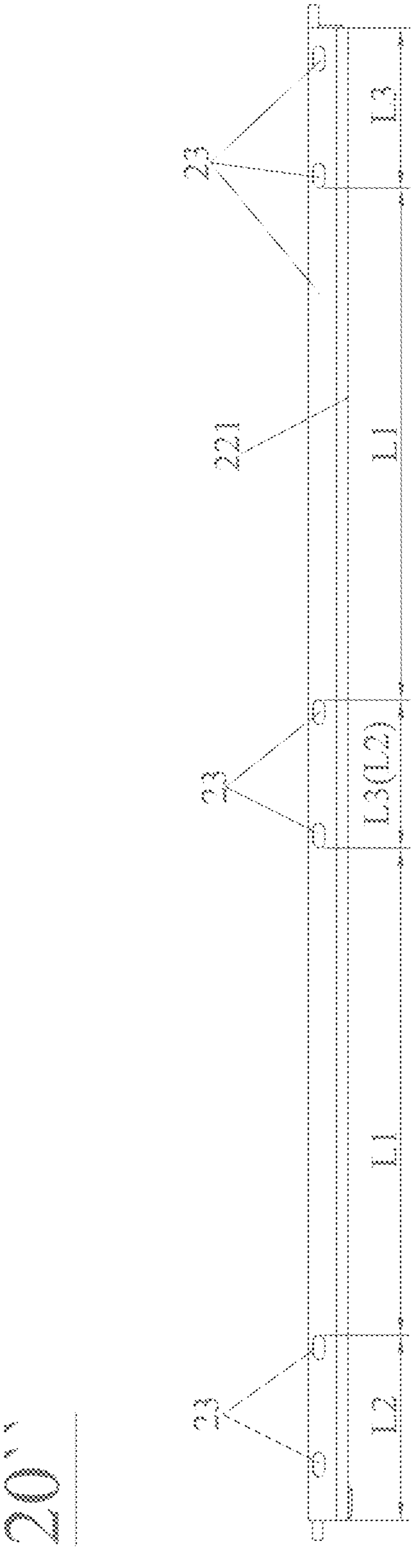
FIG. 7 is a top-down view of the resilient cutting member according to the third embodiment of the present application.

Referring to FIG. 7, the resilient cutting member 20" according to the third embodiment is structurally similar to resilient cutting member 20 according to the first embodiment, with the following differences.

First, in FIG. 7, the middle position of the metal razor blade 22 is also fixed with the platform portion 211, thus this middle position is considered as the second position L3 in regard to the left end of the metal razor blade 22, and considered as the first position L2 in regard to the right end of the metal razor blade 22. In FIG. 3, the middle position of the metal razor blade 22 is not fixed with the platform portion 211, instead, the left and right ends of the metal razor blade 22 are fixed with the platform portion 211.

Second, in FIG. 7, two welding points 23 are provided respectively at the left end, the middle position, and the right end of the metal razor blade 22, for connecting with the platform 211; while in FIG. 3, three welding points 23 are provided respectively at the left end and the right end of the metal razor blade 22, for connecting with the platform portion 211.

Apart from the above differences, everything else is the same as in the first embodiment, which is not reiterated here therefore.

Compared with the prior art, in the present application, the first position L2 and the second position L3 spaced apart in the length direction of the metal razor blade 22 are respectively fixed with the platform portion 211, and the length of the free section L1 of the metal razor blade 22 between the first position L2 and the second position L3 is greater than or equal to 10 mm and less than or equal to 30 mm, thus the free section L1 of the metal razor blade 22 makes reversible bending deformation relative to the platform portion 211 when obstructed by the hair 200 during shaving. As a result, the bent metal razor blade 22 fits more closely to the skin and adaptively changes the relationship between the cutting edge 221 of the metal razor blade 22 and the direction of force F. That is, the cutting edge 221 of the metal razor blade 22 is changed from being perpendicular to the direction of force F when in unused to being non-perpendicular to the direction of force F when in used, thereby allowing the curved cutting edge 221 to cut the hair 200 more cleanly, reducing skin irritation, and providing better comfort.

It should be noted that the arrow A in FIG. 1 indicates the direction from left to right of the razor head frame 10, and the arrow B indicates the direction from front to back of the razor head frame 10.

The above disclosure is only exemplary embodiments of the present application, and it should not be construed to limit the scope of the present application. Therefore, equivalent changes made according to the claims of the present application are still within the scope covered by the present application.

What is claimed is:

1. A resilient cutting member, comprising an elongated metal support and an elongated metal razor blade, wherein the metal support comprises an elongated platform portion that supports the metal razor blade from below, and a cutting edge of the metal razor blade is positioned directly above a front of the platform portion; a first position and a second position spaced apart in a length direction of the metal razor blade are respectively fixed with the platform portion, a length of a free section of the metal razor blade between the first position and the second position is greater than or equal to 10 mm and less than or equal to 30 mm, and the free section of the metal razor blade is configured to make a reversible bending deformation relative to the platform portion when obstructed by hair during shaving.

2. The resilient cutting member according to claim 1, wherein the free section of the metal razor blade is bent upward and backward relative to the platform portion when obstructed by hair during shaving.

3. The resilient cutting member according to claim 1, wherein one or more welding points are provided between the first position and the platform portion, and between the second position and the platform portion, the welding points are arranged and spaced apart along a length of the metal razor blade, a shortest distance between two welding points between the first position and the second position is greater than or equal to 10 mm and less than or equal to 30 mm.

4. The resilient cutting member according to claim 3, wherein the first position is formed at a left end of the metal razor blade, and the second position is formed at a right end of the metal razor blade, a distance between a rightmost welding point on the left end of the metal razor blade and a leftmost welding point on the right end of the metal razor blade is greater than or equal to 10 mm and less than or equal to 30 mm.

5. The resilient cutting member according to claim 4, wherein all welding points between the left end of the metal razor blade and the platform portion are arranged at equal spacing, and all welding points between the right end of the metal razor blade and the platform portion are arranged at equal spacing.

6. The resilient cutting member according to claim 1, wherein one or more metal razor blades are supported by the platform portion, and all metal razor blades are arranged in a row along a length thereof.

7. The resilient cutting member according to claim 1, wherein the metal razor blade comprises a uniform portion supported by the platform portion and a tapered portion extending forward beyond the platform portion, the cutting edge of the metal razor blade is located at the tapered portion, a thickness of the uniform portion ranges from 0.07 mm to 0.15 mm, and a front-to-back dimension of the metal razor blade ranges from 0.8 mm to 1.5 mm.

8. The resilient cutting member according to claim 1, wherein the metal support further comprises an elongated base portion extended obliquely backward and downward relative to the platform portion, and an elongated curved portion connecting the base portion and the platform portion, and an angle between the base portion and the platform portion ranges from 110 degrees to 120 degrees.

9. The resilient cutting member according to claim 8, wherein the metal support is made of metal with a thickness ranging from 0.10 mm to 0.32 mm, and the curved portion has a radius of curvature less than 0.1 mm.

10. A shaving system, comprising a razor head frame with a receiving space, wherein the shaving system further comprises the resilient cutting member according to claim 1, the resilient cutting member is located within the receiving space, a left end of the resilient cutting member is fitted to a left side wall of the razor head frame, a right end of the resilient cutting member is fitted to a right side wall of the razor head frame, and the cutting edge is faced to a front side wall of the razor head frame.

11. The shaving system according to claim 10, further comprising a left retainer and a right retainer, wherein the left retainer crosses over the left end of the resilient cutting member from above, and the left retainer and the left side wall of the razor head frame clamp the left end of the resilient cutting member, the right retainer crosses over the right end of the resilient cutting member from above, and the right retainer and the right side wall of the razor head frame clamp the right end of the resilient cutting member.

12. The shaving system according to claim 10, wherein the free section of the metal razor blade is bent upward and backward relative to the platform portion when obstructed by hair during shaving.

13. The shaving system according to claim 10, wherein one or more welding points are provided between the first position and the platform portion, and between the second position and the platform portion, the welding points are arranged and spaced apart along a length of the metal razor blade, a shortest distance between two welding points between the first position and the second position is greater than or equal to 10 mm and less than or equal to 30 mm.

14. The shaving system according to claim 13, wherein the first position is formed at a left end of the metal razor blade, and the second position is formed at a right end of the metal razor blade, a distance between a rightmost welding point on the left end of the metal razor blade and a leftmost welding point on the right end of the metal razor blade is greater than or equal to 10 mm and less than or equal to 30 mm.

15. The shaving system according to claim 14, wherein all welding points between the left end of the metal razor blade and the platform portion are arranged at equal spacing, and all welding points between the right end of the metal razor blade and the platform portion are arranged at equal spacing.

16. The shaving system according to claim 10, wherein one or more metal razor blades are supported by the platform portion, and all metal razor blades are arranged in a row along a length thereof.

17. The shaving system according to claim 10, wherein the metal razor blade comprises a uniform portion supported by the platform portion and a tapered portion extending forward beyond the platform portion, the cutting edge of the metal razor blade is located at the tapered portion, a thickness of the uniform portion ranges from 0.07 mm to 0.15 mm, and a front-to-back dimension of the metal razor blade ranges from 0.8 mm to 1.5 mm.

18. The shaving system according to claim 10, wherein the metal support further comprises an elongated base portion extended obliquely backward and downward relative to the platform portion, and an elongated curved portion connecting the base portion and the platform portion, and an angle between the base portion and the platform portion ranges from 110 degrees to 120 degrees.

19. The shaving system according to claim 18, wherein the metal support is made of metal with a thickness ranging from 0.10 mm to 0.32 mm, and the curved portion has a radius of curvature less than 0.1 mm.

* * * * *